United States Patent [19]

Föhl

[11] Patent Number: 4,717,088
[45] Date of Patent: Jan. 5, 1988

[54] BELT WEBBING CLAMPING DEVICE

[75] Inventor: Artur Föhl, Schorndorf, Fed. Rep. of Germany

[73] Assignee: TRW Repa GmbH, Alfdorf, Fed. Rep. of Germany

[21] Appl. No.: 935,583

[22] Filed: Nov. 26, 1986

[30] Foreign Application Priority Data

Dec. 27, 1985 [DE] Fed. Rep. of Germany .... 3546227

[51] Int. Cl.⁴ .................... B60R 22/42; A62B 35/02; B65H 75/48
[52] U.S. Cl. ................ 242/107.2; 280/806; 280/808; 297/478; 297/480; 24/170
[58] Field of Search ....... 242/107.2, 107.4 R-107.4 E; 280/806-808; 297/476, 478, 479, 480; 74/439, 443, 446, 448; 24/170

[56] References Cited

U.S. PATENT DOCUMENTS 4,193,310  3/1980  Boyer et al. ............ 74/DIG. 10 X
4,398,680  8/1983  Ogawa et al. ............ 242/107.2
4,485,985  12/1984 Fohl ..................... 242/107.2
4,491,343  1/1985  Fohl ..................... 280/801
4,494,774  1/1985  Fohl ..................... 242/107.4 A
4,531,687  2/1985  Andersson ............... 242/107.4 B

FOREIGN PATENT DOCUMENTS 2945174  5/1981  Fed. Rep. of Germany .
2155764  10/1985 United Kingdom .

Primary Examiner—Stuart S. Levy
Assistant Examiner—David Werner
Attorney, Agent, or Firm—Tarolli, Sundheim & Covell

[57] ABSTRACT

The clamping roller for a belt webbing clamping device consists of two identical plastic mouldings and a rolled steel sleeve inserted into a recess thereof. Said steel sleeve surrounds a pivot bearing pin of steel inserted into a bore of the plastic mouldings. This pivot bearing pin and the rolled steel sleeve bear on each other along a zone parallel to the axis of the clamping roller and form a composite member of high strength.

10 Claims, 6 Drawing Figures

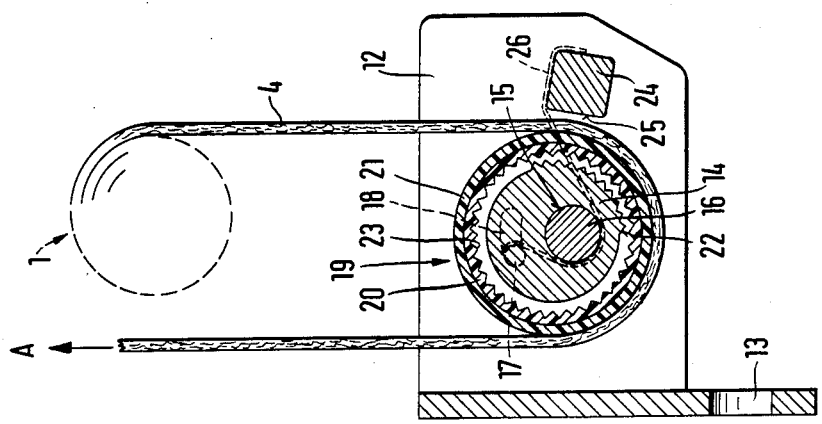
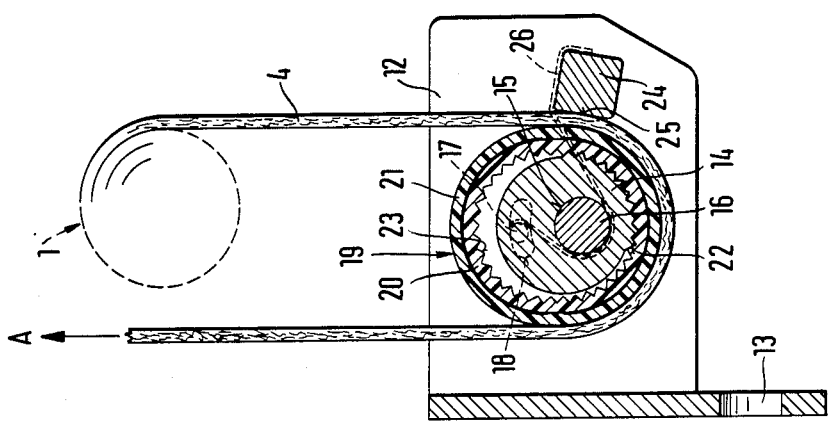
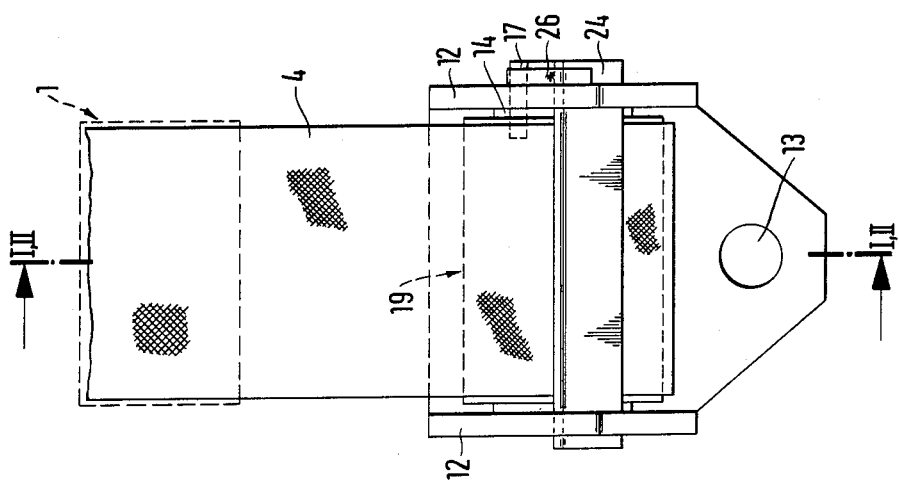

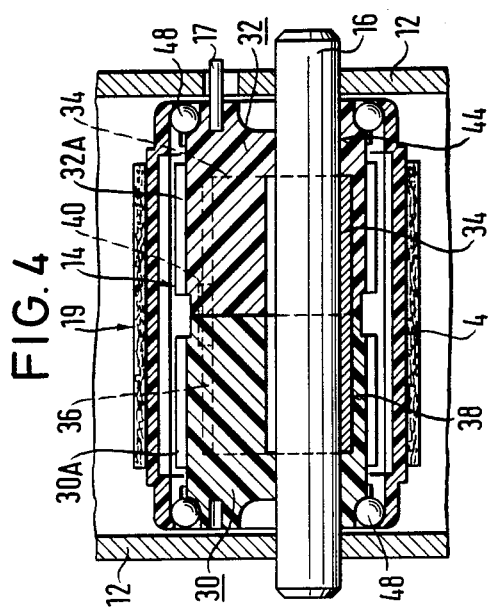
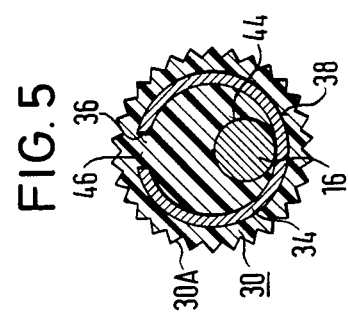
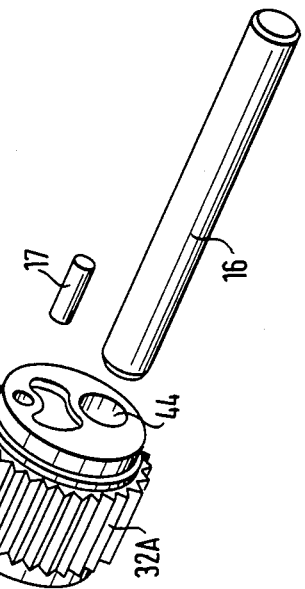
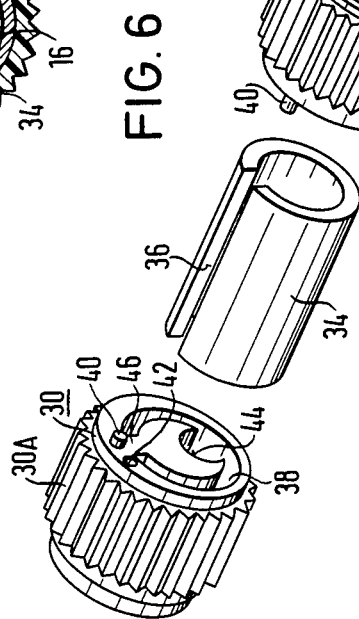

BELT WEBBING CLAMPING DEVICE

The invention relates to a belt webbing clamping device.

Such a webbing clamping device is known from U.S. Pat. No. 4,485,985. It is mounted downstream of a belt drum on which the webbing of the safety belt is wound and from which it is adapted to be uncoiled against spring bias. The clamping device includes a clamping roller pivotally mounted about an eccentric shaft and a stationary clamping face against which the roller is pivotable to clamp the webbing. The roller serves simultaneously as deflection element for the webbing. Under stress the roller and its pivot bearing pin take up the entire load occurring in the webbing and transmit said load via the fitting of the clamping device to the vehicle bodywork. A pivot bearing pin made from steel and having a diameter of some mm can withstand the stress. The clamping roller has a substantially greater diameter than the pivot bearing pin because at the same time it serves as deflection element for the webbing. The roller can be made from solid material and have a throughbore for receiving the pivot bearing pin. To save weight, the roller can be made from aluminium or a similar material. It then has adequate mechanical strength. The production of such a roller is however complicated and costly, in particular when it is provided at its outer periphery with a toothing which cooperates with a corresponding inner toothing of a flexible sleeve which is rotatably mounted on the periphery of the roller.

A primary object of the invention is to provide an improved belt webbing clamping device having a clamping roller of simple structure and reduced weight, the clamping roller being adapted to be produced, economically by using common mass production techniques.

In the belt webbing clamping device of the invention, the clamping roller is made up of a moulded member of plastic material and at least one metallic stiffening member which is adapted to be fittingly inserted into a recess formed in the moulded member.

The structure of the clamping roller according to the invention considerably simplifies its production. The plastic member can be mass produced cheaply with conventional moulding techniques. The metal stiffening member can be very simply formed, in particular as a rolled steel sleeve. Although, compared with the conventional roller of solid aluminium, a considerable saving of weight is obtained, the demands made of the mechanical strength of the roller are fully met.

A particularly economic mass production is obtained by an advantageous embodiment in which the clamping roller is formed from two cylindrical plastic mouldings which are joined together at their lateral end faces and of which each comprises a portion of the recess which is open at the respective inner end face. Although the two plastic mouldings complement each other to form the outer shape of the roller they can be made as completely identical parts even though according to an advantageous further development they are provided at their inner end faces with elements engaging in each other in form-locking manner such as studs and bores. A particularly high mechanical strength of the composite roller according to the invention is obtained in a preferred embodiment in that the reinforcing member formed as a steel sleeve surrounds the pivot bearing pin and is adjacent the latter at its inner face region lying diametrically opposite the slit. Thus, under stress the pivot bearing pin and the steel sleeve form a combination with each other by bearing on each other along a zone parallel to the axis.

Advantageous further developments of the invention will be apparent from the subsidiary claims, the following description of an example of embodiment and the drawings, to which reference is made.

In the drawings:

FIGS. 1–3 show the known belt webbing clamping device mentioned at the beginning in two side views with different actuating position (FIGS. 1, 2) and in plan view (FIG. 3);

FIG. 4 is an axial section of a roller constructed according to the invention for a belt webbing clamping device of the type shown in FIGS. 1–3;

FIG. 5 is a radial section through the roller shown in FIG. 4 and

FIG. 6 is a perspective exploded view of the roller with pivot bearing pin.

The belt webbing clamping device shown in FIGS. 1–3 is mounted in a U-shaped fitting 12 which can be secured beneath the belt drum 1 of an automatic takeup device via a fitting member having a mounting hole 13 to the frame of a motor vehicle. Between the two bent side cheeks of the fitting 12 a dimensionally stable roller 14 is rotatably mounted. The cylindrical roller 14 comprises eccentrically to its axis a bore 15 for receiving a pivot bearing pin 16 of steel. At one end side of the roller 14 a stop pin 17 is secured which is guided in a slot opening 18 in one of the side cheeks of the fitting 12. The roller 14 is therefore pivotal only over a relatively small angular path. On the roller 14 a sleeve 19 serving as deflection member is freely rotatably mounted. The sleeve 19 consists of a dimensionally stable or alternatively an elastically deformable inner sleeve 20 and an outer running sleeve 21 which is non-rotatably connected thereto and which can consist for example of a rubber elastic material. As shown in FIGS. 1 and 2 the roller 14 comprises on a portion of its outer periphery an outer toothing 22 whilst the sleeve 19 comprises at the inner periphery a blocking toothing 23 of the same tooth pitch. The sleeve 19 is freely rotatably mounted on both sides on rotary bearings. A clamping face 25 is formed on a clamping bar 24. The clamping face 25 is disposed opposite the outer surface of the sleeve 19. A spring 26 is suspended in the clamping bar 24. Said spring 26 partially surrounds the pivot bearing pin 16 and bears on the stop pin 17. By the spring 26 the roller 14 is held in the normal position shown in FIG. 1 in which between the outer surface of the webbing 4 led round the sleeve 19 and the clamp face 25 of the clamp bar 24 there is a slight spacing. In this normal position the webbing 4 can be freely wound up and unwound. When the belt drum 1 is blocked, by the forwardly moving body of the person to be secured in the direction A an increased tensile force is exerted on the webbing 4 and this tensile force overcomes the biasing of the spring 26 and pivots the roller 14 together with the sleeve 19 into the position shown in FIG. 2. By this increased tensile force a radial pressure is exerted on the sleeve 19 or the running sleeve 21 and as a result due to the yielding mounting of the sleeve 19 or due to its elastically yieldably material the previously existing radial clearance between the sleeve 19 and roller 14 is overcome and the blocking toothing 23 moves into coupling engagement with the outer toothing 22 of the roller 14 as shown in FIG. 2.

For further details of this webbing clamping device attention is drawn to U.S. Pat. No. 4,485,985.

The roller 14 according to the invention illustrated in FIGS. 4-6 consists of two generally cylindrical plastic mouldings 30, 32 and a reinforcing member 34 formed as a rolled steel sleeve. The reinforcing member 34 is of generally hollow cylindrical form and comprises a slit 36 extending parallel to its axis. The plastic mouldings 30, 32 are each provided with a portion of a recessed accommodation into which the reinforcing member 34 can be inserted. This accommodation is designated in FIG. 6 by the reference numeral 38. Since the two plastic mouldings 30, 32 are completely identical the other plastic moulding 32 is also provided with the same portion of the recessed accommodation 38. At the inner lateral end face of the plastic moulding 30 or 32 the accommodation 38 is open. This end face is further provided with a stud 40 projecting in the axial direction and a bore 42 in which the stud or pin 40 of the other plastic moulding fits.

The plastic mouldings 30, 32 are further provided with a throughbore 44 extending in the axial direction for accommodating the pivot bearing pin 16. Said bore 44 lies diametrically opposite a web 46 of the plastic mouldings 30, 32 bordering the accommodation 38 in the peripheral direction. The bore 44 and the accommodation 38 are eccentrically offset with respect to the axis of the cylindrical form of the roller 14 so that the accommodation 38 on its side opposite the web 46 extends up to close to the outer periphery of the plastic mouldings 30, 32. As readily apparent from FIG. 6 the recesses forming the accommodation 38 and the bore 44 merge into each other so that after insertion of the stiffening member 34 and of the pivot bearing pin 16 these two steel parts are directly adjacent each other along a zone extending parallel to the axis and they can contact each other. The stiffening member 34 and the pivot bearing pin 16 thus form a firm mechanical combination.

The surface of the plastic mouldings 30, 32 is provided with an encircling engagement toothing 30A, 32A. At its axially outer ends the roller 14 carries ball bearings 48 on which the sleeve 19 is mounted for easy rotation.

Although the clamping roller 14 thus formed consists mainly of light plastic parts it meets the high strength demands made of it. Compared with a conventional roller of metallic solid material a considerable saving in weight is achieved. Both the plastic mouldings 30, 32 and the reinforcing member 34 as well as the pivot bearing pin 16 are components which can be made easily and economically and which do not require any special machining.

The structure described of the roller 14 is particularly intended for a belt webbing clamping device of the type shown in FIGS. 1-3 but is also suitable for other uses.

I claim:

1. A safety belt restraint system comprising a drum on which seat belt webbing is wound and from which the seat belt webbing is unwound, a belt webbing clamping device located downstream of said drum, said belt webbing clamping device comprising a stationary clamping surface, a clamping roller, and an eccentric metal shaft for supporting said clamping roller for pivotal movement toward said clamping surface for clamping the belt webbing therebetween, said clamping roller comprising at least one molded plastic member and a reinforcing member, said plastic member having a recess formed therein for receiving said reinforcing member and a throughbore extending parallel to the axis of said clamping roller and adjacent to said recess for receiving said eccentric metal shaft, said eccentric metal shaft and said reinforcing member bearing on each other at least under stress along a zone parallel to the axis of said clamping roller.

2. A safety belt restraint system according to claim 1 wherein said clamping roller comprises two complementary molded plastic members which jointly define the outer surface of said clamping roller, the recess for receiving said reinforcing member being formed by complementary respective recesses in said complementary plastic molded members.

3. A safety belt restraint system according to claim 2 wherein the throughbore for receiving said eccentric shaft is formed by complementary respective throughbores in said complementary plastic members and located adjacent said complementary respective recesses.

4. A safety belt restraint system according to claim 2 wherein said complementary plastic members are generally cylindrical and are joined together at one of their lateral end faces, and a respective recess in each plastic member opens at the one lateral end face thereof.

5. A seat belt restraint system according to claim 4 wherein the one lateral end faces of said plastic members are provided with complementary male and female connection elements engaging each other.

6. A safety belt restraint system according to claim 1 wherein said reinforcing member is hollow and generally cylindrical.

7. A safety belt restraint system according to claim 6 wherein said hollow generally cylindrical reinforcing member is a rolled metal sleeve.

8. A seat belt restraint system according to claim 7 wherein said rolled metal sleeve has a slit extending parallel to the axis thereof.

9. A seat belt restraint system according to claim 8 wherein a surface of said plastic member defining said recess comprises a web corresponding to said slit of said rolled metal sleeve and received in said slit.

10. A seat belt restraint system according to claim 8 wherein said rolled metal sleeve surrounds said eccentric shaft and has an inner surface located diametrically opposite said slit for bearing on said eccentric shaft.

* * * * *